UNITED STATES PATENT OFFICE.

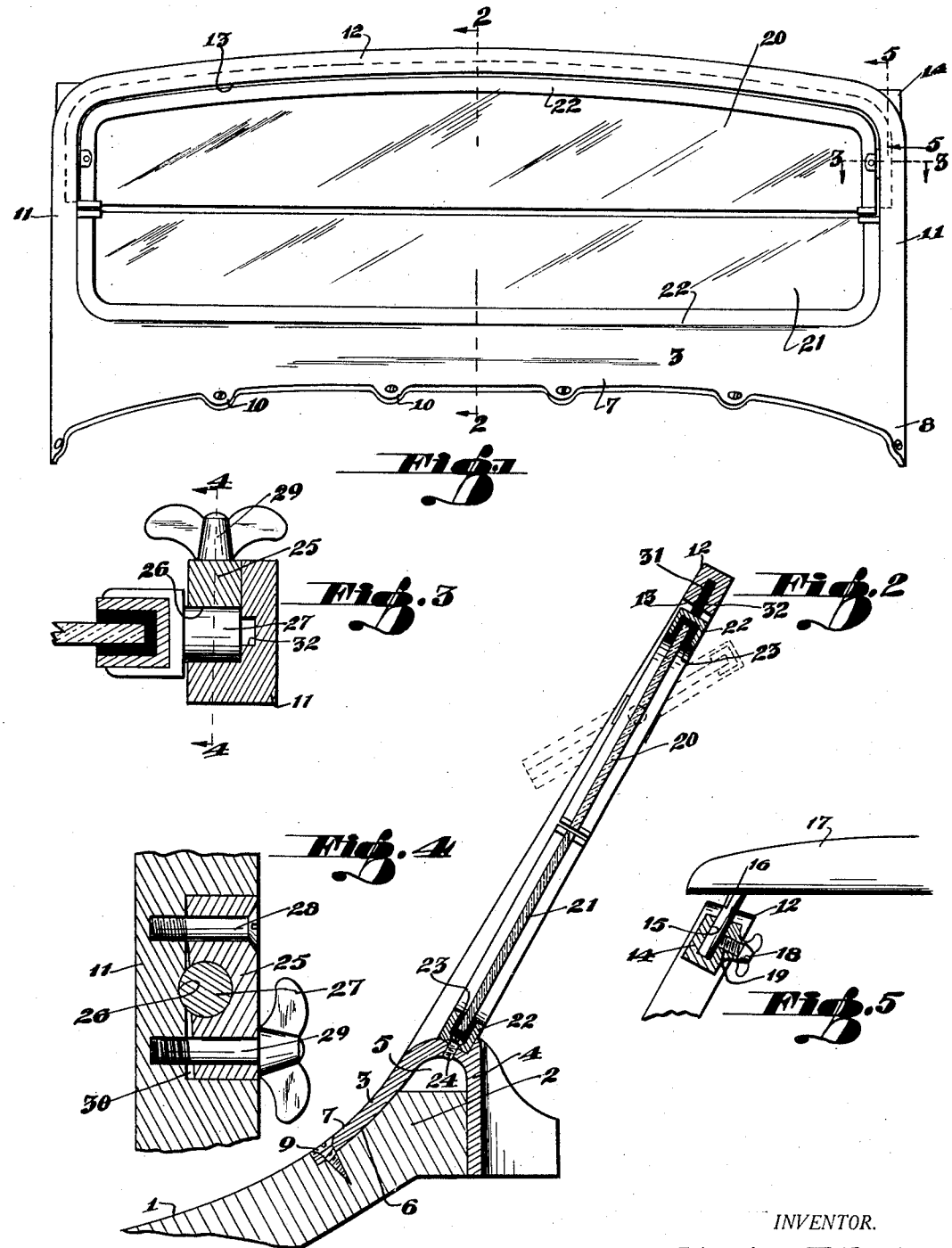

HARLEY J. EARL, OF LOS ANGELES, CALIFORNIA.

WINDSHIELD.

1,400,479. Specification of Letters Patent. Patented Dec. 13, 1921.

Application filed September 3, 1920. Serial No. 407,974.

*To all whom it may concern:*

Be it known that I, HARLEY J. EARL, a citizen of the United States, residing at Los Angeles, in the county of Los Angeles and State of California, have invented new and useful Improvements in Windshields, of which the following is a specification.

This invention relates to windshields for motor vehicles, and has for its object the provision of a windshield frame so constructed and mounted with relation to the body of the motor vehicle that the lines of the windshield will form stream line continuations of the lines of the motor vehicle body.

The invention will be readily understood from the following description of the accompanying drawings, in which—

Figure 1 is a front elevation of the windshield.

Fig. 2 is a vertical section through the same on the line 2—2 of Fig. 1, and also showing a portion of the motor vehicle body in vertical section.

Fig. 3 is a detail section on the line 3—3 of Fig. 1.

Fig. 4 is a section on the line 4—4 of Fig. 3.

Fig. 5 is a detail section on the line 5—5 of Fig. 1.

The windshield is employed in connection with an automobile, the hood of which is shown at 1 terminating in the cowl 2.

The improved windshield is so positioned that the lines thereof will form stream line continuations of the line of curvature between the hood and the cowl. For this purpose the windshield frame consists of a single casting mounted over the edge of the cowl and countersunk into the surface of the cowl, so that the exterior surface of the windshield forms a smooth continuation of the exterior surface of the hood and cowl.

In the particular embodiment of the invention illustrated, the casting for the windshield frame is shown as comprising a base substantially U-shaped in cross section with the respective sides of the U-shaped base shown at 3 and 4. The groove formed by the U-shaped base is shown at 5 and the upper edge of the cowl 2 is received in said groove with the side 4 of the base extending downwardly along the rear side of the cowl, and the side 3 extending down over the exterior surface of the cowl.

The cowl is countersunk as shown at 6 in order to receive the side 3 of the windshield base, and said side is outwardly curved and extended forwardly to form the apron 7 which makes a continuation of the lines of the hood and cowl. At the side edges of the windshield the apron 7 is curved downwardly as shown at 8 so as to conform to the curvature of the hood and cowl at these points. The base of the windshield frame may be secured to the body of the motor vehicle by means of screws 9 extending through suitable lugs 10 provided at the front edge of aprons 7.

The sides and top of the windshield frame, shown at 11 and 12, form an integral continuation of the base of the frame and provide the usual opening 13 in which the windshield plates are received. Lugs 14 may form integral continuations of sides 11 beyond top 12 in order to provide connecting means for the top of the motor vehicle. For this purpose the lugs 14 are provided with bearings 15 in which are received the usual depending connecting pins 16 of the motor vehicle top 17. The parts may be detachably held in connected position by means of set screws 18 threaded through apertures 19 in the sides of lugs 14.

The windshield plates received within opening 13 are shown at 20 and 21. These plates are received in usual U-shaped channel bar frames 22 arranged within opening 13 with the edges of the windshield plates, upon which there is no frame, forming the meeting edges between said plates. The windshield plates are, preferably, mounted in the grooves of the channel bars 22, preferably with resilient packing 23 interposed between the plates and the channel bars. The lower windshield plate 21 is, preferably, fixed within the windshield frame as by means of screws 24 extending through the channel bar forming the frame of the plate into the windshield frame.

The upper windshield plate 20 is pivoted at its side edges to the sides of the windshield frame. As an instance of this arrangement the sides 11 of the windshield frame may be provided with recesses in which are received bearing blocks 25, said bearing blocks and the main portions of sides 11 coöperating to form bearings 26 in which are received pivot pins 27 projecting from the side of frame 22 of windshield plate 20. The bearing blocks 25 are, preferably, fixed with relation to the main portions of sides 11 at one side of pins 27 as by means of screws 28, and at the other side of pins 27 the bearing blocks are, preferably, adjustable with relation to sides 11 as by means of screws 29 arranged to be manually actuated for moving the bearing blocks toward or away from sides 11 in order to provide clamping means for pins 27 within bearings 26. In order to provide for the adjustment of blocks 25 with relation to sides 11 the meeting edges of the same are, preferably, spaced apart at screws 29 as shown at 30.

By the arrangement as thus set forth it will be seen that by loosening screws 29 the windshield plate 20 may be swung upon the pivots provided by pins 27 and may then be clamped in adjusted positions by tightening screws 29. In order to provide a tight joint between the windshield plate 20 and the windshield frame, a packing strip 31, preferably, extends inwardly from the top and sides of the windshield frame around the windshield plate 20, said packing strip being received in a suitable groove 32 provided in the windshield frame.

Various changes may be made without departing from the spirit of the invention as claimed.

What is claimed is:

1. The combination with a stream line cowl for a motor vehicle, of a windshield frame, the base of which fits over the cowl so that the lines of the windshield form interrupted continuations of the stream lines of said hood, and a glazed frame adjustably arranged in said windshield frame.

2. The combination with a stream line cowl of a motor vehicle, of a windshield frame having a grooved base received snugly over the edge of said cowl so as to form an uninterrupted continuation of said stream lines.

3. The combination with the cowl of a motor vehicle, of a windshield frame having a grooved base received over the edge of said cowl, said base being countersunk into said cowl and forming a continuation of the surface thereof.

4. A windshield frame having a base comprising a front downwardly curved apron, and a rear depending lip forming a groove between the same, said windshield being mounted with the edge of the cowl of an automobile received in said groove and said apron countersunk into said cowl so as to form a continuation of the surface thereof.

In testimony whereof I have signed my name to this specification.

HARLEY J. EARL.